United States Patent

Kataoka

[11] Patent Number: 5,921,734
[45] Date of Patent: Jul. 13, 1999

[54] LOCK NUT DEVICE

[75] Inventor: Noboru Kataoka, Anjo, Japan

[73] Assignee: Ishigame Kogyo Co., Ltd., Aichi-ken, Japan

[21] Appl. No.: 09/120,228

[22] Filed: Jul. 22, 1998

[30] Foreign Application Priority Data

Sep. 25, 1997 [JP] Japan ................................. 9-260458

[51] Int. Cl.$^6$ ............................. F16B 37/08; F16B 39/36
[52] U.S. Cl. ........................... 411/269; 411/433; 411/935
[58] Field of Search ................................. 411/267, 268,
411/269, 432, 433, 935

[56] References Cited

U.S. PATENT DOCUMENTS

| | | | |
|---|---|---|---|
| 490,585 | 1/1893 | McCormick | 411/269 |
| 1,081,239 | 12/1913 | Lantz | 411/269 X |
| 5,118,237 | 6/1992 | Wright | 411/433 |

FOREIGN PATENT DOCUMENTS 595473  12/1947  United Kingdom ................... 411/433

Primary Examiner—Neill Wilson
Attorney, Agent, or Firm—Armstrong, Westerman, Hattori, McLeland & Naughton

[57] ABSTRACT

A lock nut device having a nut setting member fitted loosely to an outer circumferential part of a threaded shaft; split nuts divided in two in axial direction and fitted to envelope the outside of the nut setting member and fitted to the threaded shaft, the slit nuts having inner threads and a locking groove into which the nut setting member, at an inner surface of the nut setting member, is fitted and having an outer tapered thread at an outer circumferential part; and a lock nut having an inner threaded tapered surface in threaded engagement with the outer tapered threaded surface of the split nuts. To fix the nut setting member the threaded shaft, the nut setting member is placed around the outer circumferential part of the screw shaft and tightened to a prescribed position. The split nuts divided in two are fitted so as to envelop the outer circumference of the screw shaft and the nut setting member. The nut setting member is fitted into a locking groove provided at the inner circumference of the split nuts, and the inner screw of the split nuts is fitted to the thread of the screw shaft. Thus, the split nuts divided in two are held in the assembled state in one body at a desired position of the outer circumferential part of the screw shaft by the fitting of the locking groove at the inside and the nut setting member. In this state, the lock nut is threadedly engaged with the outer circumferential part of the split nuts and is tightened.

4 Claims, 2 Drawing Sheets

LOCK NUT DEVICE

BACKGROUND OF THE INVENTION

1. Field of the Invention

The present invention relates to a lock nut device which is used for various sorts of machines, materials, tools and the like, where a nut is threadedly engaged with a threaded shaft to lock the threaded shaft with a machine, material, tool, or the like.

2. Description of the Prior Art

In the prior art, as a lock nut device, where a nut is to be threadedly engaged with a shaft to be locked, a lock nut device, using a dividing type nut is proposed as, for example, in JP-A 9-72327, JP-A 6-280840 and JP-U 6-1827. Also, although not a lock nut device, a fastener having a threaded part divided in two is shown in U.S. Pat. No. 5,090,857 and U.S. Pat. No. 5,226,678.

The device in JP-A 9-72327 includes a structure where a nut main body has an inner screw and two slits in axial direction and a non-slide surface or an outer screw is provided on a part of a taper outer wall surface of the nut main body, an outside body has a non-slide surface or an inner screw, to be fitted to the non-slide surface or threadedly engaged with the outer screw of the nut main body, and the nut main body is grasped utilizing the engagement of the non-slide surface or the inner screw of the outside body with the non-slide surface or the outer screw of the main body, thereby the threaded engagement and grasping state between the screw shaft and the inner screw of the nut main body is secured and the nut main body is locked. However, since the structure of the nut main body is not a completely dividing type, there is a problem that the grasping force is limited, or when the nut main body is to be fitted to the screw shaft, the nut main body must be inserted from the end portion of the screw shaft and, inevitably, can not be simply fitted from the outside of the screw shaft to any position.

The device in JP-A 6-280840 includes an outside body of nut-like external shape having an inner wall part of taper shape, with the diameter decreasing, gradually, toward one small-diameter opening and having a slit formed in the longitudinal direction at the side of the other large-diameter opening; split nuts, divided in two, with an outside surface of taper shape corresponding to the inner wall part of taper shape of the outside body having a screw formed on an inside wall surface and having an operation arm projected to be engaged with the slit; and a coil spring for energizing the split nuts toward the inner wall part side of taper shape within the outside body, where the split nuts are pressed into the outside body of nut-like external shape through a mounting ring and the coil spring. However, since the lock nut device is complicated in the structure and the number of parts, such as, a coil spring, a cover, or the like, is increased and the operation arm is projected at the split nuts, there is a problem and the machining of the split nuts is difficult.

Further, the device in JP-U 6-1827 has structure that split nuts, divided in two, are arranged within a case with an inner circumferential surface formed in taper, and a suspension bolt is threadedly engaged with the split nuts. An operation part, extending to the outside, is projected from each split nut and is fitted to a groove hole bored on the case, and the split nuts are moved in the axial direction of the case and in the radius direction by the guide action of the inner circumferential surface in taper shape of the case, thereby, the suspension bolt is fixed. However, because the case of the device is fixed to the lower surface of the ceiling panel and the suspension bolt is suspended and threadedly engaged there, the application area is limited and there is a problem that the lock nut can not be locked generally at any position of the bolt or the screw shaft.

SUMMARY OF THE INVENTION

A lock nut device of the present invention comprises a nut setting member loosely fitted to an outer circumferential part of a screw shaft, such as, a bolt; split nuts divided in two in axial direction and fitted so as to envelope the outside of the nut setting member fitted to the screw shaft, the split nuts having an inner thread and a locking groove into which the nut setting member is to be fitted at an inner surface and having an outer thread of taper shape at an outer circumferential part; and a lock nut having an inner thread to be threadedly engaged with the outer thread in taper shape of the split nuts.

In the nut setting member, a simple annular nut setting ring or a C-type ring with a part thereof cut away may be used. Also in the split nuts, a polygonal head in the same shape as that of the lock nut may be provided.

In order to fix a lock nut to a threaded shaft, such as, a bolt using the lock nut device, first, a nut setting member is put around an outer circumferential part of the threaded shaft and then stood still to a desired position.

Next, split nuts divided in two are fitted to each other so as to envelope the threaded shaft and the outer circumference of the nut setting member. Then, the nut setting member is fitted into a locking groove provided on the inner circumference of the split nuts, and the inner threads of the split nuts are fitted to the thread of the screw shaft. The two split nuts are held in integrally fitted state at a desired position of the outer circumferential part of the screw shaft by the fitting of the locking groove at the inside of the split nuts and the nut setting member to each other.

Next, the lock nut is put around the threaded shaft and the lock nut is threadedly engaged with the outer thread on the outer circumferential part of the split nuts, and then the split nuts are tightened by turning the lock nut. Then, since a gap exists at the fitted portion of the two split nuts and, further, the outer screw, on the outer circumference of the split nuts, is formed in taper surface and also the inner threads of the lock nut corresponds to the shape, the split nuts are tightened and fixed strongly on the threaded shaft by turning the lock nut.

On the other hand, in order to release the lock of the lock nut device, the lock nut is turned in the loosening direction and the tightening of the split nuts is released if the lock nut is detached from the outer circumference of the split nuts, the split nuts can be easily detached from the outer circumferential part of the threaded shaft. Consequently, since the nut setting member, fitted loosely to the outer circumference of the threaded shaft becomes free, it can be moved to any position along the threaded shaft or detached from the threaded shaft.

The lock nut device can be constituted by parts being very small in number, the nut setting member, the split nuts and the lock nut, and the nut can be locked to any position of the threaded shaft, such as, a bolt, rapidly and simply. Also even if the split nuts are fastened with rust, they can be easily detached by detaching the lock nut.

An object of the present invention is to provide a lock nut device which can lock a nut to any position of a threaded shaft, such as, a bolt simply, securely and strongly by the above-mentioned configuration and can be constituted by parts of minimum number.

DESCRIPTION OF THE PREFERRED EMBODIMENTS

Figure 1:
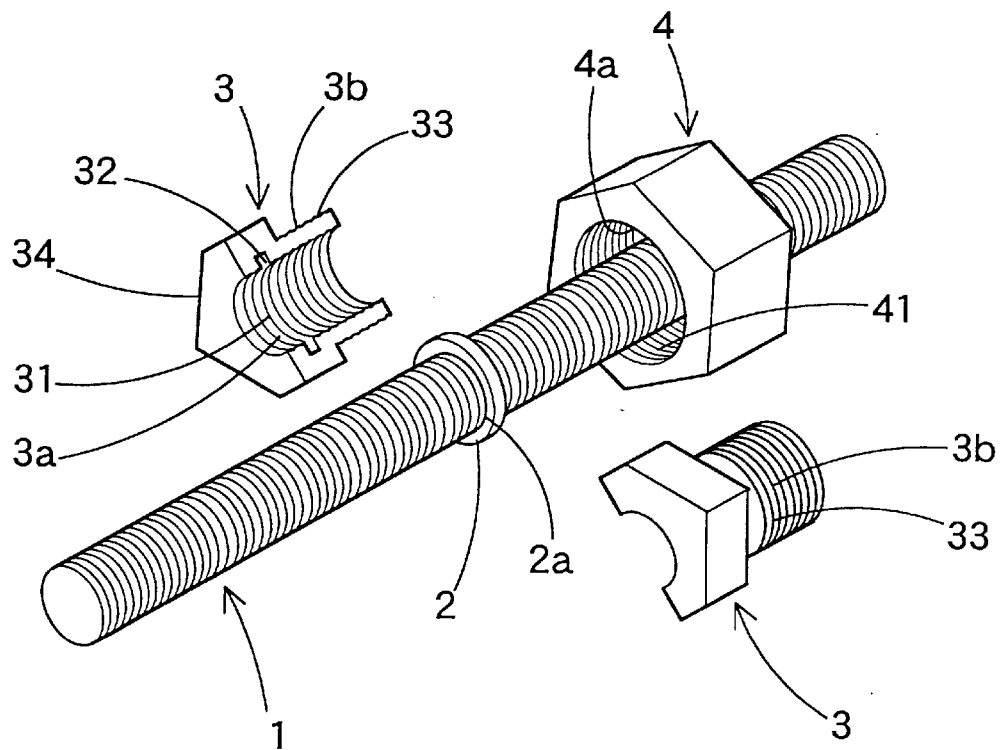
FIG. 1 is an exploded perspective view of a lock nut device showing an embodiment of the invention.
Figure 2:
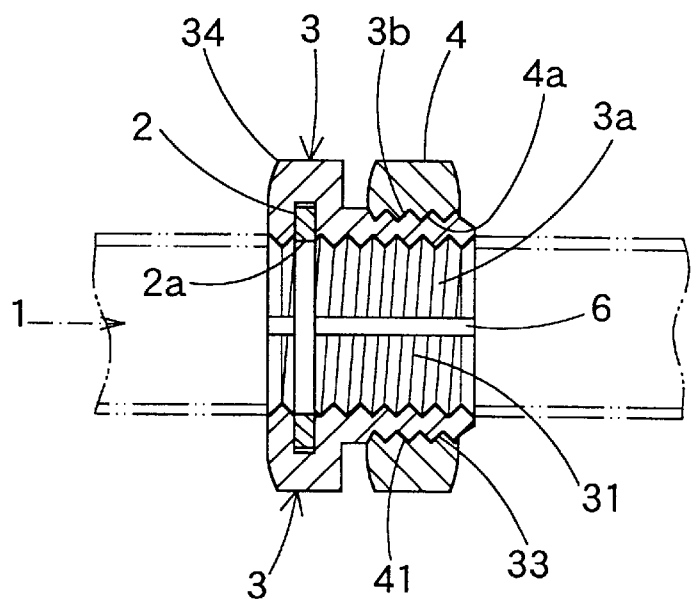
FIG. 2 is a sectional view of an assembled lock nut device of FIG. 1.
Figure 3:
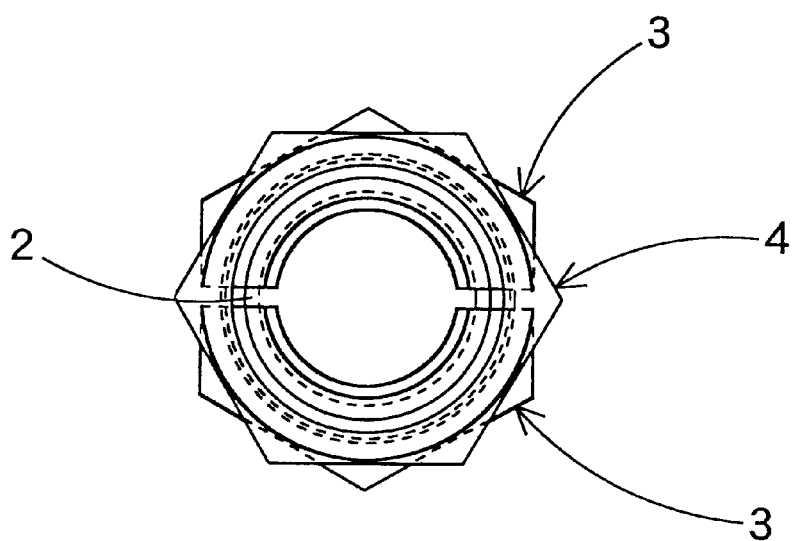
FIG. 3 is an end view, taken from the right end of FIGS. 1 and 2 of a lock nut device.

FIG. 1 is an exploded perspective view of a lock nut device showing an embodiment of the present invention, and FIG. 2 is a sectional view of a lock nut device of FIG. 1, in assembled state. A threaded shaft 1 is constituted by a threaded part, such as, a threaded shaft or a bolt, to be used for various sorts of machines, materials, tools, and the like. A nut setting ring 2 is loosely fitted to an outer circumference of the threaded shaft 1, and can be easily moved and held still at any position.

Split nuts 3 have a taper thread part divided into two parts in the axial direction of the nuts, and at an inner surface 3a of the split nuts 3, an inner thread 31 for engagement with an outer thread of the threaded shaft 1. At the inner surface of both split nuts 3, a locking groove 32 is provided into which the nut setting ring 2 can be inserted. Width of the locking groove 32 formed in split nuts 3 are nearly the same as that of nut setting ring 2. When the nut setting ring 2 is inserted in the locking groove 32, the nut setting ring 2 can be easily fitted on threaded shaft 1. The depth of the locking groove 32 is larger than the thickness of the nut setting ring 2.

Also, a hexagonal head 34 is provided at one end of split nuts 3. Shape of the head 34 is the same as that of the head of lock nut 4 described later. An outer circumference of a cylindrical part succeeding the head 34 is in taper shape with diameter decreasing toward the end, and an outer thread 33 is formed on an outer circumferential surface 3b of the cylindrical part. Both split nuts 3, 3 divided in two, are formed so that when the inner thread 31 is threadedly engaged with and fitted to the outer circumference of threaded shaft 1, a gap 6 is formed between split nuts 3, 3.

As inner surface 4a of the lock nut 4 is tapered corresponding to the outer circumferential surface 3b of the cylindrical part of the split nuts 3, and the inner surface 4a has provided an inner thread 41 threadedly engaged with the outer thread 33.

In order to fix a nut to threaded shaft 1, using a lock nut device in the above-mentioned configuration, first, the nut setting ring 2 is placed around the outer circumferential part of the threaded shaft 1 and stands still in a prescribed position.

Next, split nuts 3, divided in two, are fitted so as to envelope the outer circumference of threaded shaft 1 and the nut setting ring 2. The nut setting ring 2 is fitted into a locking groove 32, FIG. 1, provided at the inner circumference of the split nuts 3, and the inner screw 31 of the split nuts 3 is fitted to the thread of threaded screw shaft 1. Thus, the split nuts 3, divided in two, are held in the assembled state in one body at a desired position of the outer circumferential part of threaded shaft 1 by the fitting of the locking groove 32 at the inside and the nut setting ring 2.

Next, a lock nut 4 is put around the threaded shaft 1 and also threadedly engaged with the outer thread 3b on the outer circumferential part of the split nuts 3, and both split nuts 3 are tightened by turning the lock nut 4. Then a gap 6 exists at a joining portion between the two split nuts 3, and further because the outer screw 3b on the outer circumference of the split nuts 3 is formed in a taper surface and the inner screw 4a of the lock nut 4 corresponding to the shape of the outer screw 3b, the split nuts 3 are tightened and fixed strongly on the screw shaft 1 by turning the lock nut 4.

In order to release the lock of the lock nut device, the lock nut 4 is turned in the loosening direction and the tightening of the split nuts 3 is released. If the lock nut 4 is detached from the outer circumference of the split nuts 3, the split nuts 3 can be easily detached from the outer circumferential part of the screw shaft 1. Thus, since the nut setting ring 2, fitted loosely to the outer circumference of the screw shaft 1 becomes free, it can be moved along the screw shaft 1 to any position or detached from the screw shaft 1.

The lock nut device can be constituted by very small number of parts, the nut setting ring 2, the two split nuts 3 and the lock nut 4, and can lock a nut rapidly, and simply, to any position of a screw shaft 1, such as a bolt. Even if the split nuts are fastened with rust, the split nuts can be easily detached by detaching the lock nut, and the lock nut device can be conveniently used for various sorts of machines, transporting devices and the like.

Figure 4:
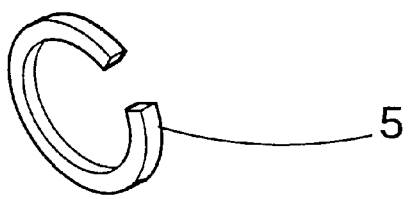
FIG. 4 is a perspective view of a C-type nut setting ring.

The C-type ring 5 with a part thereof cut away, as shown in FIG. 4, is used as a nut setting ring, and also a divided-type ring, can be used.

What is claimed is:

1. A lock nut device comprising:

(a) a nut setting member fitted loosely to an outer circumferential part of a threaded shaft;

(b) split nuts divided in two in axial direction and fitted so as to envelope the outside of said nut setting member fitted to said threaded shaft, said split nut having an inner thread and a locking groove into which said nut setting member is to be fitted at an inner surface and having an outer thread in taped shape at an outer circumferential part; an (c) a lock nut having an inner thread threadedly engaged with the outer thread in taper shape of said split nuts.

2. A lock nut device as set forth in claim 1, wherein said nut setting member is an annular nut setting ring.

3. A lock nut device as set forth in claim 1, wherein said nut setting member is a C-type ring with a part thereof cut away.

4. A lock nut device as set forth in claim 1, wherein said split nuts have the same shape as that of the lock nut.

* * * * *